United States Patent
Karlsson et al.

(10) Patent No.: US 6,536,330 B2
(45) Date of Patent: Mar. 25, 2003

(54) PISTON CYLINDER DEVICE

(75) Inventors: Tommy Karlsson, Göteborg (SE); Malte Isaksson, Sävedalen (SE)

(73) Assignee: Volvo Personvagnar AB, Göteborg (SE)

(*) Notice: Subject to any disclaimer, the term of this patent is extended or adjusted under 35 U.S.C. 154(b) by 0 days.

(21) Appl. No.: 09/769,003

(22) Filed: Jan. 24, 2001

(65) Prior Publication Data

US 2001/0037726 A1 Nov. 8, 2001

Related U.S. Application Data

(63) Continuation of application No. PCT/SE99/01309, filed on Jul. 23, 1999.

(30) Foreign Application Priority Data

Jul. 24, 1998 (SE) .............................. 9802608

(51) Int. Cl.⁷ ............................................. F16J 15/18
(52) U.S. Cl. .................................. 92/165 R; 92/170.1
(58) Field of Search ......................... 92/165 R–169.1, 92/170.1

(56) References Cited

U.S. PATENT DOCUMENTS

| | | | | |
|---|---|---|---|---|
| 4,480,530 A | * | 11/1984 | Holmes ........................ | 92/78 |
| 4,844,392 A | * | 7/1989 | Bauer et al. ................. | 248/162.1 |
| 4,856,762 A | * | 8/1989 | Selzer ......................... | 267/64.12 |
| 5,275,387 A | * | 1/1994 | Cotter et al. ................. | 267/64.11 |

FOREIGN PATENT DOCUMENTS

| | | |
|---|---|---|
| DE | 1239141 | 4/1967 |
| DE | 2816761 A1 | 10/1979 |
| DE | 4000245 C1 | 2/1991 |
| DE | 4209985 A1 | 9/1993 |
| DE | 19721816 A1 | 12/1997 |
| DE | 29806048 U1 | 7/1998 |
| EP | 0364851 A1 | 4/1990 |

* cited by examiner

Primary Examiner—Edward K. Look
Assistant Examiner—Igor Kershteyn
(74) Attorney, Agent, or Firm—Howrey Simon Arnold & White LLP

(57) ABSTRACT

An arrangement for a piston-and-cylinder unit is disclosed. The arrangement includes a cylinder member and a piston member movable therein, to which a piston rod is connected. The cylinder member includes a barrel pipe and closure portions at each end of the cylinder member, with the closure portion at one end exhibiting a bush. The bush is provided with a through bore for the piston rod and is enclosed by an end portion of the barrel pipe. The end portion is bent radially inwards, towards the piston rod and over a first circumferential surface of the bush. The bush is provided with a collar portion exhibiting an external second circumferential surface of the bush, enclosing the circumference of the piston rod and extending axially beyond the inwardly bent portion. The inwardly bent portion of the barrel pipe terminates in a circumferential edge located adjacent to a positive corner of the bush formed between the first circumferential surface and the second circumferential surface.

26 Claims, 2 Drawing Sheets

US 6,536,330 B2

PISTON CYLINDER DEVICE

RELATED PATENT APPLICATIONS

This is a continuation patent application of International Application Number PCT/SE99/01309 filed Jul. 23, 1999 entitled PISTON CYLINDER DEVICE and which designates the United States and the disclosure of which is hereby expressly incorporated herein in its entirety.

TECHNICAL FIELD

The present invention relates to an arrangement for a piston-and-cylinder unit.

BACKGROUND OF THE INVENTION

Piston-and-cylinder units are frequently located in an outdoor environment, exposed to varying temperatures, air humidity, and the like, each of which provide a breeding ground for corrosive attacks. Examples of such piston-and-cylinder units might be so-called "gas springs" or "gas dampers" for force balancing and damping of various kinds of doors or lids. EP-A1 -0 364 851 discloses a piston-and-cylinder unit which is an example of a method for reducing the corrosion problems. This piston-and-cylinder unit exhibits a closure portion consisting of a bush enclosed by an end portion of a barrel pipe of the piston-and-cylinder unit. The end portion is bent inwards, towards the piston rod extending through the bush, so as to terminate the cylinder barrel with a circumferential edge that is generally directed perpendicularly to the longitudinal direction of the barrel pipe; that is, the axial direction of the piston-and-cylinder unit. The barrel pipe is usually made of a resistant and relatively easily workable material, such as carbon steel, which is corrodible. Because of this, the barrel pipe is surface treated with corrosion-protective coatings, normally a pretreatment and one or more coats of lacquer. It has, however, turned out that the circumferential edge receives a thinner coat of lacquer which results in corrosion attacks over time. This limits the service life of the cylinder unit in many applications. On the piston-and-cylinder unit according to the referenced publication, a separate component has therefore been arranged in the form of a resilient protection ring of rubber, plastic or similar material, that covers the end portion of the barrel pipe and its inward-directed circumferential edge. Through this, a certain weather protection is obtained, as long as the protection ring is undamaged. These rings of plastic, rubber, and the like, however, have a limited service life and may also cause condensation that is not ventilated off and therefore can create corrosion problems. Furthermore, such a protection ring entails an additional component that adversely affects the cost of this piston-and-cylinder unit.

In view of the above described deficiencies associated with conventionally designed piston-and-cylinder devices, the present invention has been developed. These enhancements and benefits are described in greater detail hereinbelow with respect to several alternative embodiments of the present invention.

SUMMARY OF THE INVENTION

The present invention in its several disclosed embodiments alleviates the drawbacks described above with respect to conventionally designed piston-and-cylinder devices and incorporates several additional beneficial features.

An object of the present invention is to provide an arrangement by which the corrosion problem described hereinabove is resolved without the need of dedicated sealing members. In a more specific example, a piston-and-cylinder arrangement is disclosed having a cylinder member and a piston member connected to a piston rod. The piston member and the piston rod are movable within the cylinder member. The cylinder member has a barrel pipe and closure portions at each of two ends thereof. One of the closure portions has a bush provided with a through bore in which the piston rod is located and enclosed. That end portion is bent radially inwards towards the piston rod and over a first circumferential surface of the bush. The bush has a collar portion that establishes an external second circumferential surface of the bush. The collar portion encloses the piston rod and extends axially beyond the inwardly bent portion. The inwardly bent portion of the barrel pipe terminates in a circumferential edge located adjacent to an inner corner of the bush formed between the first circumferential surface and the second circumferential surface.

In the presently disclosed arrangement, the barrel pipe may be provided with a highly covering corrosion protection, contributing positively to the service life of the piston-and-cylinder and-cylinder unit. Through utilizing the surface tension effects created at an inner corner according to the invention, improved lacquer coverage and a thicker coating layer is achieved, providing improved corrosion protection.

The beneficial effects described above apply generally to the exemplary devices, mechanisms and methods disclosed herein for piston-cylinder devices. The specific structures and methods through which these benefits are delivered will be described in detail hereinbelow.

BRIEF DESCRIPTION OF THE DRAWINGS

The invention will now be described in greater detail in the following way, by example only, and with reference to the attached drawings, in which.

DETAILED DESCRIPTION OF THE INVENTION:

As required, detailed descriptions of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
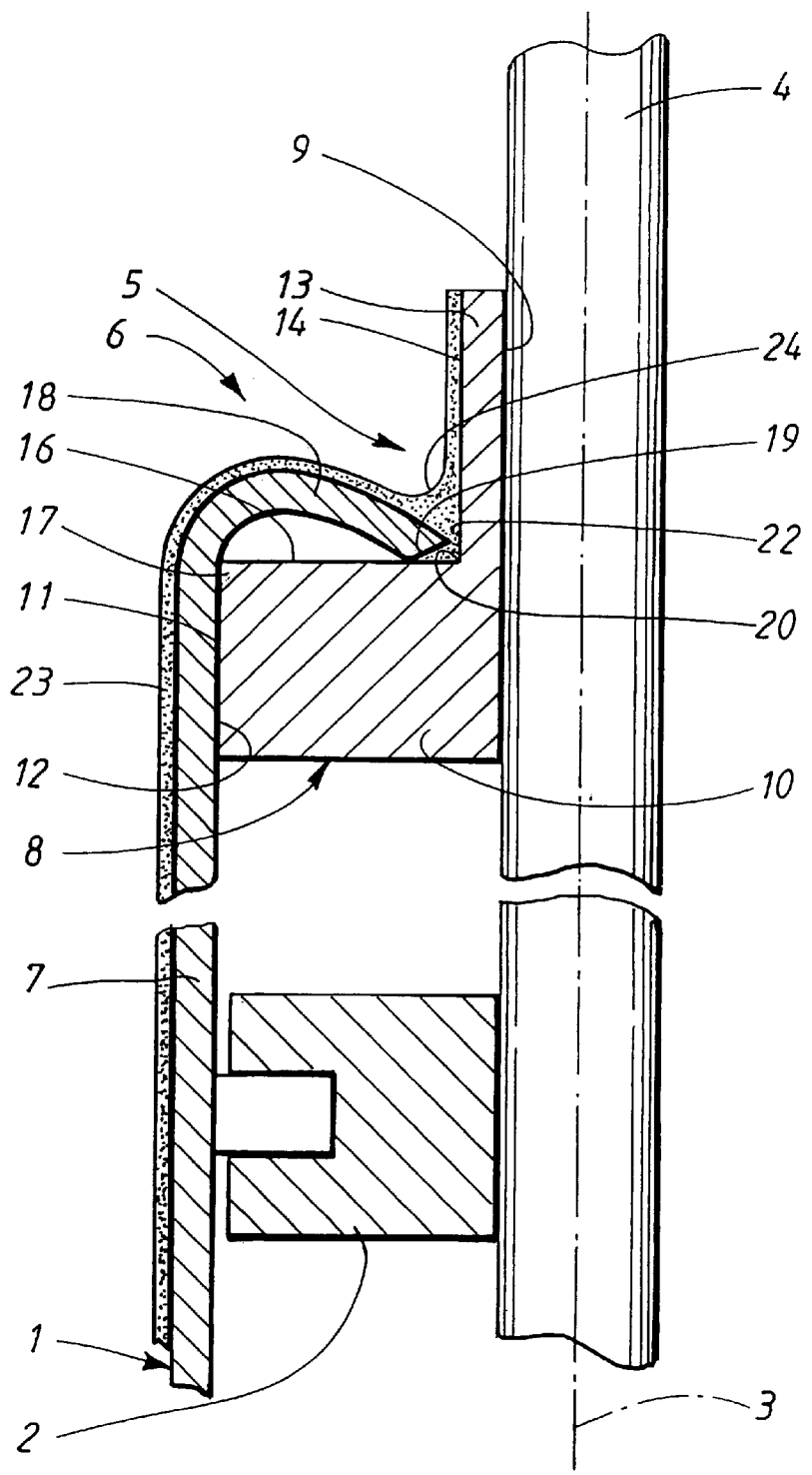
FIG. 1 illustrates, by a partially broken longitudinal section, a portion of a piston-and-cylinder unit, provided with an arrangement according to a first embodiment of the invention.

FIG. 1 shows, by way of a partially broken longitudinal section, one end of a piston-and-cylinder unit, for example, as used in a gas spring or gas damper for the balancing of forces and damping of opening and closing movements, respectively, of a door. The door may, for example, be the boot lid or the bonnet of an automotive vehicle. The piston-and-cylinder unit includes a cylinder member 1, enclosing a piston member 2, reciprocally movable in a linear motion inside the cylinder member. The piston member is connected to a piston rod 4, extending along the longitudinal axis 3 of the piston-and-cylinder unit and being displaceable together with said piston member 2. The piston rod extends from one end 5 of the cylinder member 1 through a closure portion 6, which, together with a barrel pipe 7 and an opposite closure portion (not shown), located at the other end of the barrel pipe, defines the cylinder member.

The illustrated closure portion 6, also defining the through passage for the piston rod 4, consists of a bush 8, preferably made of a non-corrodible material such as plastic, bronze, or similar material. The bush exhibits a cylindrical lead-through bore 9, sealingly enclosing the through piston rod 4. Further, the bush is designed as a generally cylindrical body 10, arranged in the barrel pipe at one end 5 thereof and exhibiting a generally cylindrical, radially outwards directed surface 11, in contact with the cylindrical inner wall 12 of the barrel pipe. This connection may be gas or fluid tight, but usually, a separate sealing device is located in the barrel pipe below the bush. The bush 8 is further designed with a sleeve-like collar portion 13 that defines an extension of the through bore 9 and exhibits a substantially cylindrical, external surface 14. The external surface 14, via a corner 20, transcends into a substantially flat, radially extending surface 16. The corner 20 thus defines a circumferential inner edge, whereas the radial surface 16 extends radially outwards, towards a circumferential external edge 17, where a transition takes place to the cylindrical envelope surface 11.

The closure portion 6 also comprises, besides the bush 8, an end portion of the barrel tube, transcending substantially from the external edge 17 of the bush into an inwardly bent portion 18. More precisely, the bent portion in this first embodiment is continuously curved inwards, down towards the body 10 of the bush 8. This entails that the circumferential edge of the bent portion, which defines a radially inwards directed circumferential edge 19 of the barrel pipe, in this example, receives a general direction towards the corner 20. Furthermore, the circumferential edge 19 of the bent portion 18 preferably exhibits as small a clearance 22 as possible in relation to the collar portion external surface 14. The circumferential edge 19 may further be sharp, through consisting of, for example, a cut edge that is cut at an angle relative to the inwardly bent portion 18.

In order to protect the barrel pipe 7 from corrosion, it will be coated with a corrosion-protecting coating 23, for example applied by some form of paint coating method such as wet enameling. Advantageously, the coating method is of the electrostatic coating type using a charging of the lacquer particles before application. Through shaping the bent portion 18 of the barrel pipe in the fashion discussed above, a positive corner 24 is further created at the circumferential edge 19 whereby surface tension effects create a thicker layer of lacquer at this corner. In this way extra corrosion protection is provided at exactly that portion of the barrel 1, which otherwise, with previously known designs, will have a weakened corrosion protection at the corresponding circumferential edge because a thinner coating of lacquer will be formed at the cut edge; i.e., at the circumferential edge. The lacquer protection should, at the corner 20 of the bush, completely fill out the clearance 22 and form a well rounded transition to the collar section 13, in the shape of one single rounded portion 24.

Figure 2:
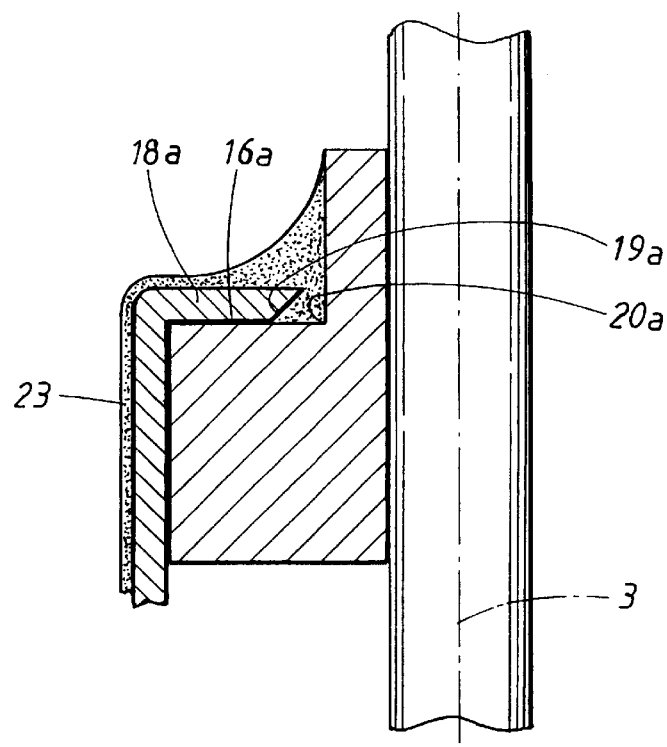
FIG. 2 and FIG. 3 illustrate second and a third embodiments of the invention, respectively.

The second embodiment according to FIG. 2 differs from FIG. 1 by the inwardly bent portion 18*a* closely following the circumferential surface 16*a*, providing an advantageous filling of the inner corner 20*a*.

Figure 3:
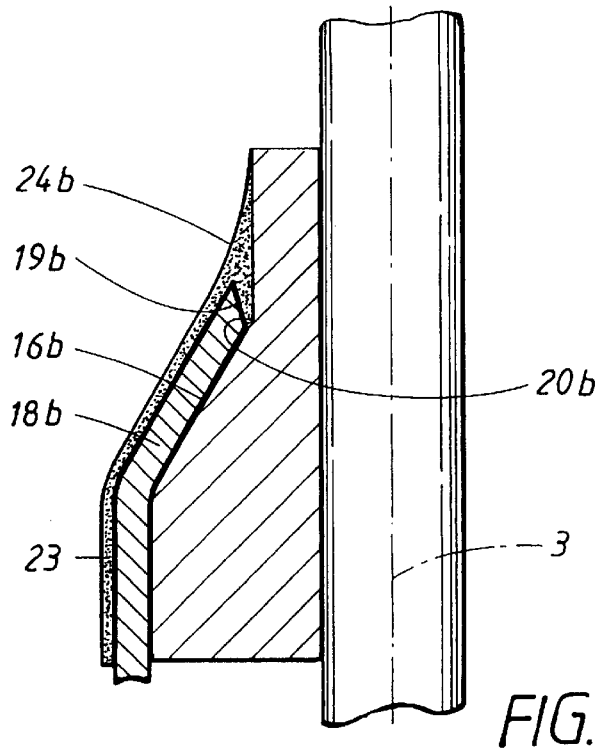

In the third embodiment, according to FIG. 3, the circumferential surface 16*b* is conical, whereby the inwardly bent portion 18*b* takes the shape of a truncated cone, also referred to as a frustoconical shape. The corner 20*b* will be obtuse, creating a softly rounded portion 24*b* of the lacquer coating. Also in this case, the circumferential edge 19*b* can be sharp.

The invention is not limited to the embodiments described above and depicted in the drawings, but may be varied within the scope of the accompanying patent claims. For example, the bent portion 18 might be replaced by two bent portions; i.e., one bent portion around the edge 17 and a radial, inner, bent portion adjoining the circumferential edge 19, which portions are separated by a planar portion. The figures show only one side of the end portion of the barrel pipe; there is, however, a complete mirror-inverted symmetry in relation to the longitudinal axis 3.

What is claimed and desired to be secured by Letters Patent is as follows:

1. An arrangement for a piston-and-cylinder unit, comprising:

a cylinder member, a piston member moveable therein, and a piston rod connected to said piston member, said cylinder member comprising a barrel pipe and closure portions at each end of the cylinder member, the closure portion at one end exhibiting a bush, provided with a through bore for the piston rod and enclosed by an end portion of the barrel pipe, said end portion being bent radially inwards towards the piston rod and over a first circumferential surface of the bush to form a cavity defined by said end portion and said first circumferential surface, said bush comprising a collar portion exhibiting an external second circumferential surface of the bush, said collar portion enclosing the circumference of the piston rod and extending axially beyond the inwardly bent portion, wherein the inwardly bent portion of the barrel pipe terminates in a circumferential edge located adjacent to an inner corner of the bush formed between the first circumferential surface and the second circumferential surface.

2. The arrangement according to claim 1, wherein said circumferential edge is located adjacent to the collar portion such that a corrosion-protecting coating of said end portion fills out said corner, creating one single, rounded portion extending from said inwardly bent portion to said second circumferential surface of the bush.

3. The arrangement according to claim 2, wherein said inwardly bent portion of the barrel pipe exhibits a continuous inwards curve towards said corner.

4. The arrangement according to claim 3, wherein said circumferential edge is beveled so as to define in shape the envelope surface of a truncated cone, having its base towards the first circumferential surface.

5. The arrangement according to claim 2, wherein said first circumferential surface extends generally perpendicularly to the longitudinal axis of the piston rod, and the inwardly bent portion generally closely follows the first circumferential surface.

6. The arrangement according to claim 5, wherein said circumferential edge is beveled so as to define in shape the envelope surface of a truncated cone, having its base towards the first circumferential surface.

7. The arrangement according to claim 2, wherein the first circumferential surface defines in shape the envelope surface of a truncated cone, and that the circumferential edge is beveled in relation to the inwardly bent portion.

8. A piston-and-cylinder arrangement comprising:

a cylinder member, and a piston member connected to a piston rod, said piston member and said piston rod being moveable within said cylinder member;

said cylinder member comprising a barrel pipe and closure portions at each of two ends thereof, wherein one of said closure portions having a bush provided with a through bore in which said piston rod is located and enclosed, said end portion being bent radially inwards towards the piston rod and over a first circumferential surface of the bush forming a cavity defined by said end portion and said first circumferential surface; and said bush having a collar portion that establishes an external second circumferential surface of the bush, said collar portion enclosing said piston rod and extending axially beyond the inwardly bent portion, said inwardly bent portion of the barrel pipe terminating in a circumferential edge located adjacent to an inner corner of the bush formed between the first circumferential surface and the second circumferential surface.

9. The arrangement according to claim 8, wherein said circumferential edge is located substantially close to said collar portion that a corrosion-protecting coating on said end portion fills said corner, creating one single, rounded portion extending from said inwardly bent portion to said second circumferential surface of the bush.

10. The arrangement according to claim 9, wherein said inwardly bent portion of the barrel pipe has a continuous inwards curve towards said corner.

11. The arrangement according to claim 10, wherein said circumferential edge is beveled and defines an envelope surface of a frustoconical having a base directed towards the first circumferential surface.

12. The arrangement according to claim 9, wherein said first circumferential surface extends generally perpendicularly to the longitudinal axis of the piston rod, and the inwardly bent portion follows closely the first circumferential surface.

13. The arrangement according to claim 12, wherein said circumferential edge is beveled thereby defining an envelope surface of a truncated cone having a base directed towards the first circumferential surface.

14. The arrangement according to claim 9, wherein the first circumferential surface defines an envelope surface of a truncated cone having a circumferential edge beveled in relation to the inwardly bent portion.

15. An arrangement for a piston and cylinder unit, the arrangement comprising:

a cylinder member, a piston member movable in said cylinder member, and a piston rod connected to said piston member, said cylinder member further comprising a barrel pipe and closure portions at each end of the cylinder member, and a bush at least one end of said closure portions, said bush having a through bore for the piston rod and being enclosed by an end portion of the barrel pipe, said end portion being bent radially inwards towards the piston rod and over a first circumferential surface of the bush, said bush further comprising a collar portion having an external second circumferential surface of the bush, said collar portion enclosing the circumference of the piston rod and extending axially beyond the inwardly bent portion, the inwardly bent portion of the barrel pipe terminating in a circumferential edge located adjacent to an inner corner of the bush formed between the first circumferential surface and the second circumferential surface, wherein said circumferential edge is located substantially close to said collar portion so that a corrosion-protecting coating of said end portion fills out said corner, creating one single, rounded portion extending from said inwardly bent portion to said second circumferential surface of the bush.

16. The arrangement according to claim 15 wherein said inwardly bent portion of the barrel pipe exhibits a continuous inwards curve towards said corner.

17. The arrangement according to claim 16 wherein said circumferential edge is beveled so as to define in shape the envelope surface of a truncated cone having its base towards the first circumferential surface.

18. The arrangement according to claim 15 wherein said first circumferential surface extends generally perpendicularly to the longitudinal axis of the piston rod and the inwardly bent portion generally follows the first circumferential surface.

19. The arrangement according to claim 18 wherein said circumferential edge is beveled so as to define in shape the envelope surface of a truncated cone having its base towards the first circumferential surface.

20. The arrangement according to claim 15 wherein said first circumferential surface defines in shape the envelope surface of a truncated cone and the circumferential edge is beveled in relation to the inwardly bent portion.

21. A piston-and-cylinder arrangement comprising:

a cylinder member, and a piston member connected to a piston rod, wherein said piston member and said piston rod are movable within said cylinder member, said cylinder member further comprising a barrel pipe and closure portions at each of two ends thereof, wherein one of said closure portions has a bush provided with a through bore in which said piston rod is located and enclosed, said end portions being bent radially inwards towards the piston rod and over a first circumferential surface of said bush, and said bush further comprising a collar portion that establishes an external second circumferential surface of the bush, said collar portion enclosing said piston rod and extending axially beyond the inwardly bent portion, said inwardly bent portion of the barrel pipe terminating in a circumferential edge located adjacent to an inner corner of the bush formed between the first circumferential surface and the second circumferential surface, wherein said circumferential edge is located adjacent to said collar portion so that a corrosion-protecting coating on said end portion fills said corner and creates one single, rounded portion extending from said inwardly bent portion to said second circumferential surface of the bush.

22. The arrangement according to claim 21 wherein said inwardly bent portion of the barrel pipe has a continuous inwards curve towards said corner.

23. The arrangement according to claim 22 wherein said circumferential edge is beveled and defines an envelope surface of a frustroconical shape having a base directed towards the first circumferential surface.

24. The arrangement according to claim 21 wherein first circumferential surface extends generally perpendiculary to the longitudinal axis of the piston rod and the inwardly bent portion follows the first circumferential surface.

25. The arrangement according to claim 24 wherein circumferential edge is beveled thereby defining an envelope surface of a truncated cone having a base directed towards the first circumferential surface.

26. The arrangement according to claim 21 wherein first circumferential surface defames an envelope surface of a trucated cone having a circumferential edge beveled in relation to the inwardly bent portion.

* * * * *